(12) United States Patent
Young et al.

(10) Patent No.: US 6,185,560 B1
(45) Date of Patent: Feb. 6, 2001

(54) SYSTEM FOR AUTOMATICALLY ORGANIZING DATA IN ACCORDANCE WITH PATTERN HIERARCHIES THEREIN

(75) Inventors: Kai W. Young, Edison; Vidya S. Chandy, Bedminster; Aiqun Wu, Parsippany, all of NJ (US); Eric C. Steinhart, New York, NY (US)

(73) Assignee: SunGard eProcess Intelligance Inc., Livingston, NJ (US)

( * ) Notice: Under 35 U.S.C. 154(b), the term of this patent shall be extended for 0 days.

(21) Appl. No.: 09/060,655

(22) Filed: Apr. 15, 1998

(51) Int. Cl.$^7$ ........................................ G06F 17/30
(52) U.S. Cl. ................ 707/6; 707/1; 707/2; 707/3; 707/4; 707/5; 707/101; 707/102
(58) Field of Search ................ 707/1, 2, 3, 4, 707/5, 6, 101, 102; 370/252; 382/227; 702/168

(56) References Cited

U.S. PATENT DOCUMENTS

| | | |
|---|---|---|
| 4,506,326 | 3/1985 | Shaw et al. ........................ 707/4 |
| 4,570,217 * | 2/1986 | Allen et al. ........................ 382/227 |
| 4,975,975 * | 12/1990 | Filipski ........................ 382/227 |
| 5,020,019 | 5/1991 | Ogawa ........................ 707/5 |
| 5,101,424 * | 3/1992 | Clayton et al. ........................ 379/10 |
| 5,552,982 | 9/1996 | Jackson et al. ........................ 707/531 |
| 5,576,954 | 11/1996 | Driscoll ........................ 707/3 |
| 5,583,763 | 12/1996 | Atcheson et al. ........................ 707/3 |
| 5,600,833 | 2/1997 | Senn et al. ........................ 707/1 |
| 5,604,899 | 2/1997 | Doktor ........................ 707/3 |
| 5,640,554 | 6/1997 | Take ........................ 707/10 |
| 5,659,724 | 8/1997 | Borgida et al. ........................ 707/3 |
| 5,659,729 | 8/1997 | Nielsen ........................ 707/3 |
| 5,659,730 | 8/1997 | Kelley et al. ........................ 707/3 |
| 5,659,736 | 8/1997 | Hasegawa et al. ........................ 707/100 |
| 5,664,178 | 9/1997 | Sinofsky ........................ 707/100 |
| 5,758,331 * | 5/1998 | Johnson ........................ 705/412 |
| 5,787,278 * | 7/1998 | Barton et al. ........................ 707/1 |
| 5,805,831 * | 9/1998 | Fuyama ........................ 707/104 |
| 5,982,753 * | 11/1999 | Pendleton ........................ 370/252 |

* cited by examiner

Primary Examiner—Thomas G. Black
Assistant Examiner—Diane D. Mizrahi
(74) Attorney, Agent, or Firm—Seyfarth Shaw

(57) ABSTRACT

An information retrieval system processes a report-based data stream which includes report data having text lines comprised of fields, wherein each field is described by the type of data in the field. The system automatically abstracts the text line patterns from the report data by automatically classifying the text lines into species representative of text lines having a predetermined relationship to one another, automatically creating a definition of each species in terms of the species' constituent fields and automatically creating a virtual table definition specifying the hierarchical relationships among species based on functional type. The system automatically creates tables listing for each text line in the report, the species which the text line best matches, links entries in the list based on relationships specified in the virtual table, and then utilizes the linked list to generate virtual records in response to user-generated queries.

24 Claims, 9 Drawing Sheets

SYSTEM FOR AUTOMATICALLY ORGANIZING DATA IN ACCORDANCE WITH PATTERN HIERARCHIES THEREIN

BACKGROUND OF THE INVENTION

The present invention relates to information retrieval systems and, in particular, to "report mining" systems for processing report-based data so that the data is susceptible of electronic access and interrogation.

Much business information is contained in reports of many different types. For example, such reports may include external reports for use in communicating with the outside world, such as invoices, statements, purchase orders, financial reports and the like, and internal reports for use in management of the business. While such reports may be presented in printed media, they are typically generated with the aid of computers and are essentially page-based documents designed to present function-related information in a format easily understandable by the end user for satisfying the user's requirements. Thus, space-saving techniques are commonly used in the design of reports to fit them on a printed page. For example, headers are printed only at the beginning of a section or the top of the page; transactions of a particular type may be grouped together and labeled only once, etc. To make sense of the report, the end user mentally links these various pieces of information together as he or she reads.

Computer storage of such reports can be effected through a technology known as Computer Output to Laser disk ("COLD") storage, but this technique treats computer reports under the same paradigm as any scanned document, i.e., the page paradigm. Formerly, report pages were often converted to a picture format (such as TIFF), which takes up a great deal of storage space. Today, most COLD systems continue under the page paradigm despite the fact that the format restriction has lifted, since it requires much less space to store a page of binary spool file than to store a picture format. When page-based COLD storage systems are asked to find a transaction that meets certain criteria, the computer retrieves either the line that relates to the header or the line that relates to the transaction. It is unable to link the two to put the information into the full context.

Furthermore, much information which is buried in reports is simply unavailable to computer access because, unlike a relational database, the report-based data is not organized in an easily searchable manner. It is possible to reorganize report information by rekeying it into other database-type systems for analysis, but this is an expensive and time-consuming process. Furthermore, the resulting database, while having many promising attributes for information retrieval, is designed to optimize the performance of on-line transaction processing systems, and not to support an end user's ad hoc problem-solving tasks. Also, relational databases typically lack the query tools necessary to empower end users, since they require a comprehension of the technical data schema of the database, which usually requires the services of a database expert.

Accordingly, report-mining systems have been provided which essentially process report-based data into a virtual database, which permits the data to be accessible for query by ordinary end users, as if the data were in a database, while retaining the inherent logic of the report design and the look and feel of the picture or image format of the report. One such report mining system is provided by Microbank Software, Inc. under the trade designation "STORQM 2.X" This system is based on the premise that there exists an organizational hierarchy in a report, i.e., that all of the data in a report appear in a structured fashion and are related by being in the same report. Thus, related data fields typically appear together on a report in a pattern of fields. The system defines a pattern as being a set of contiguous data fields, i.e., a block of data that can be defined over many contiguous lines, a single line or a portion of a line. Patterns can also be defined at certain pre-specified and fixed locations on a report page. The system operates to identify and define these patterns and the organizational hierarchy or "view", that exists among them in a report, and then utilizes the pattern definitions and the hierarchy to create virtual "records" that can be derived in response to queries.

While that system is effective, it requires considerable user activity and entails certain inflexibilities and ambiguities. Thus, for example, the user must select from the report a collection of data blocks which the user believes should comprise a pattern, so that the user essentially manually initially determines the patterns before the system abstracts the patterns from the sample data blocks selected by the user.

Also, because of the way patterns are defined, the system can allow a region of text in a report to be matched by more than one pattern, which implies that the same region of text can have different semantic meanings. Furthermore, there is little indication in the system when a region that is meant to match a pattern does not, which impairs the confidence in the reliability of the extracted data. Also, there is no cross validation between patterns defined, i.e., many patterns can overlap in definition and or be exactly identical. Also, the hierarchies or "views" of the overall report abstracted by the system can overlap or even be exactly identical, which can impair the querying function.

During the data extraction process using the prior system the construction of virtual records can be upset by interrupting patterns, such as headers which are repeated for readability rather than because they carry useful information. Also, the system does not allow interruptions between lines in a multi-line pattern. Such interruptions can often occur in the form of page breaks and insignificant headers, thereby artificially forcing definition of separate patterns before and after the page break or header.

SUMMARY OF THE INVENTION

It is a general object of the invention to provide an improved information retrieval system of the report mining type which avoids the disadvantages of prior systems while affording additional structural and operating advantages.

An important feature of the invention is the provision of a system of the type set forth, which permits fully automated abstraction of patterns inherent in report-based data streams.

In connection with the foregoing feature, another feature of the invention is the provision of a system of the type set forth, which is line-centered, in that it abstracts patterns existing as complete text lines in a report.

In connection with the foregoing feature, yet another feature of the invention is the provision of a system of the type set forth, which stipulates that each and every line of data in a report must match a pattern, and which addresses exceptions by either creating a new pattern or modifying an existing pattern to include the exception.

Another feature of the invention is the provision of a system of the type set forth, which abstracts from a report a well-defined collection of non-overlapping patterns.

Another feature of the invention is the provision of a system of the type set forth, which effectively disregards page breaks and non-significant text blocks in defining patterns.

Still another feature of the invention is the provision of a system of the type set forth, which automatically generates virtual tables defining line patterns by type, based on location and frequency of occurrence in the report, and establishes links among those definitions to facilitate data extraction.

Another feature of the invention is the provision of a system of the type set forth, which creates a virtual database of structural patterns inherent in report-based data and generates virtual records from the virtual database in response to user queries.

In connection with the foregoing features, another feature of the invention is the provision of a method of processing report-based data to achieve the foregoing features.

Some of these and other features of the invention may be attained by providing, in a system of the type including a computer with associated storage media and a user interface coupled thereto for retrieving meaningful information from a report-based stream of data which includes data from a report, the improvement comprising:

a routine executed by the computer, including:

(a) a first portion automatically identifying and defining patterns in data from a report and a hierarchy among such patterns; and (b) a second portion using the patterns and the hierarchy to automatically extract information from the data to permit creation of virtual records in response to queries.

Other features of the invention may be attained by providing a system of the type set forth, wherein the report data is arranged in text lines comprised of fields, wherein each field is described by the type of data in the field, and wherein the automatic identification and definition of patterns includes (a) automatically classifying the text lines into text line species, wherein each species is representative of text lines having a predetermined relationship to one another; and (b) automatically creating a definition of each species in terms of the species constituent fields to form an invention of defined species.

Still further features of the invention may be attained by providing a system of the type set forth, wherein the computer routine extracts data from a report by (a) automatically scanning data from a report line-by-line and determining for each text line the species which the text line best matches;

(b) creating a list showing for each text line of the report the species which the text line best matches; and (c) generating links among entries in the list based on species relationships.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
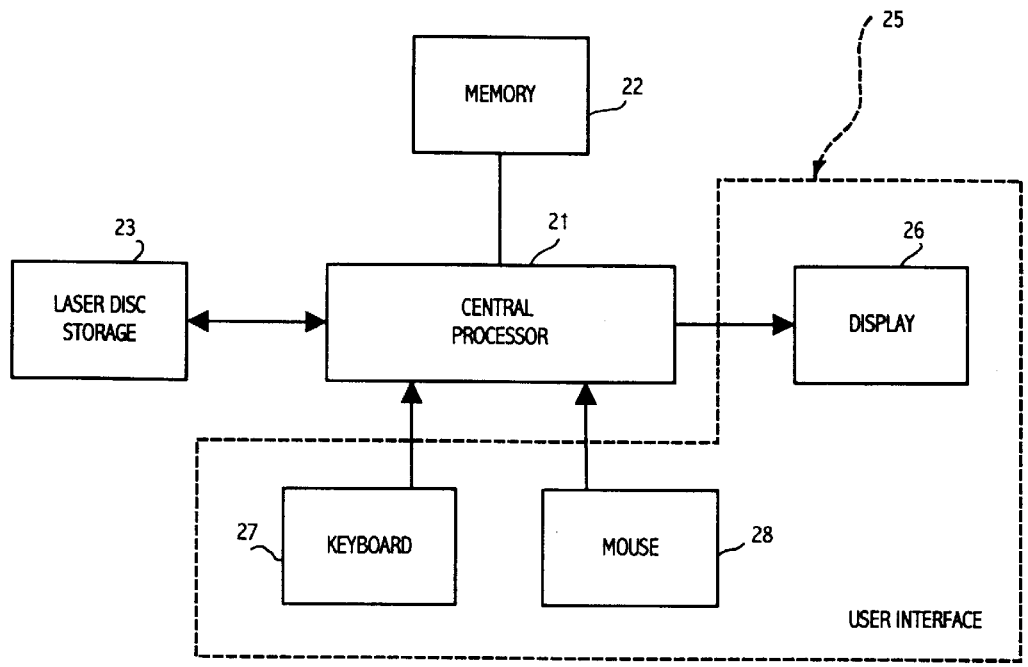
FIG. 1 is a functional block diagrammatic view of hardware components of a system in accordance with the present invention.

Referring to FIG. 1, the system of the present invention is intended to be used with a computer system 20, which will typically include a central processor 21 and an associated memory 22. The processor 21 may be coupled to a storage device 23, which may be laser disk, magnetic disk or other suitable storage medium and is also provided with a user interface 25, which includes a suitable display 26, such as a CRT display, and one or more input devices, such as a keyboard 27 and a mouse 28. The memory 22 typically includes ROM and RAM memory and stores program software, including the report processing software of the present invention, as well as report data during running of the report processing system of the present invention. The processor 21 processes the report-based data stream in accordance with the present invention, the data stream typically being generated elsewhere and stored on the laser disk storage device 23 by a COLD storage technique, or on other storage media by suitable techniques.

The goal of the present invention is to process a report-based data stream to provide an accurate response to a user-defined query with respect to the data stream, in much the same way that a database system would respond to a query made by a user. The invention adopts a line-centered approach to report structure management. It recognizes a report as being a sequence of repeating text line species or types. As used herein, the term "Line Species" refers to an abstraction (meta-definition) of a set of data fields appearing in the same physical line in a report. It may be referred to as a "pattern". An "instance" of a Line Species is a text line that satisfies a Line Species definition.

Figure 2:
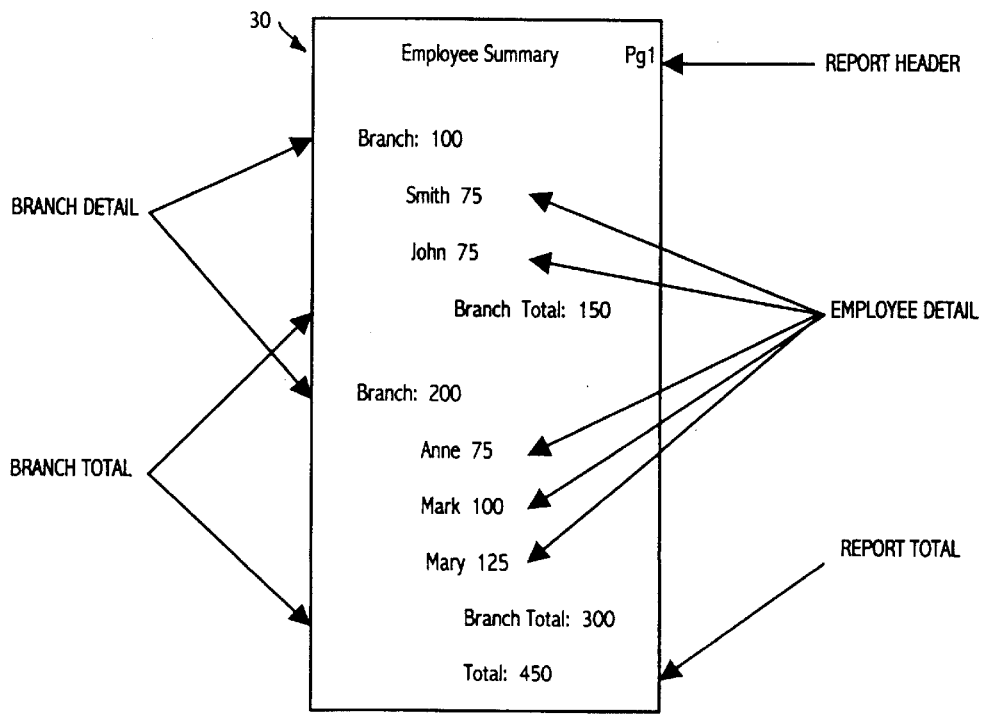
FIG. 2 is an illustration of a page of a report of the type with which the present invention may be used.

Referring to FIG. 2, there is illustrated a page from a hypothetical report entitled "Employee Summary", the report page being generally designated by the numeral 30. The report may include a plurality of similar pages. The report page 30 includes a number of different patterns or Line Species, respectively designated "Report Header", "Branch Detail", "Employee Detail", "Branch Total" and "Report Total".

Within the report, data can be thought of as belonging to nested pattern hierarchies. Thus, within the full contextual range of the report, there exists the first pattern level of contextual sub-ranges. Each contextual sub-range may contain a sequence of pattern (Line Species) instances, all of which are within the same context. For instance, in the report page 30, the highest level of organization may be the branch number, and the branch number applies to all pattern instances within its contextual sub-range. Since there is a hierarchy, a contextual sub-range can itself have sub-ranges corresponding to the next lower level in the organizational hierarchy. At the bottom of the hierarchy is the core pattern or patterns, in this case the employee details. Each non-core pattern instance gives context to (or applies to) pattern instances at lower levels that are in its contextual sub-range. Therefore, all non-core pattern instances apply to the core instances in the same contextual sub-range. Each Line Species or pattern defines a set of one or more fields of data. Thus, e.g., the Report Header species has Report Name, Page Label and Page Number fields.

Figure 5:
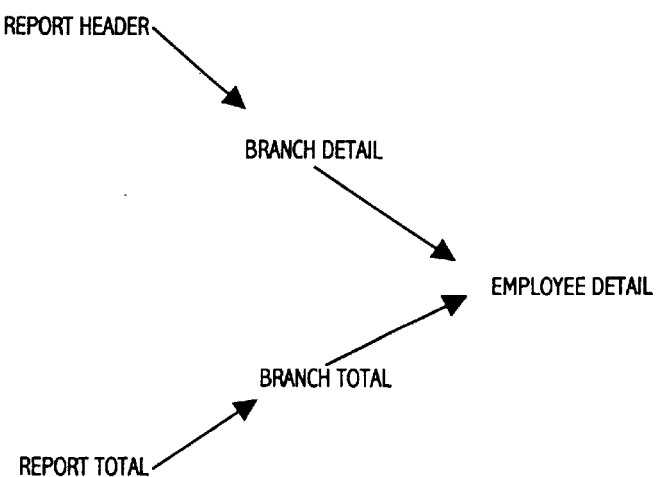
FIG. 5 is a diagram of the structural hierarchy of the patterns within the report page of FIG. 2.

By observation, it can be seen that the patterns in the report of FIG. 2 are organized into the nested hierarchy illustrated in FIG. 5. Each pattern in a report exists at some level in the hierarchy. A "header" refers to a pattern that precedes the core patterns within the contextual sub-range, while a "trailer" refers to a pattern that follows the core patterns within the contextual sub-range.

Figure 3A:
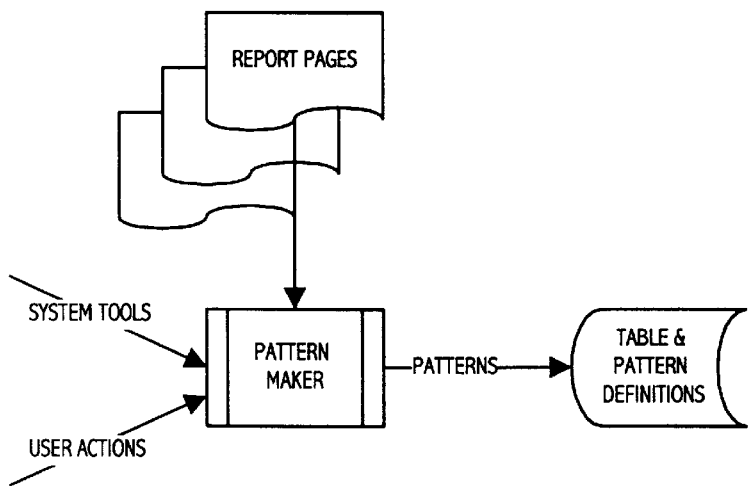
FIGS. 3A–3C are diagrammatic illustrations of the three main phases of the use of the system of the present invention.
Figure 3B:
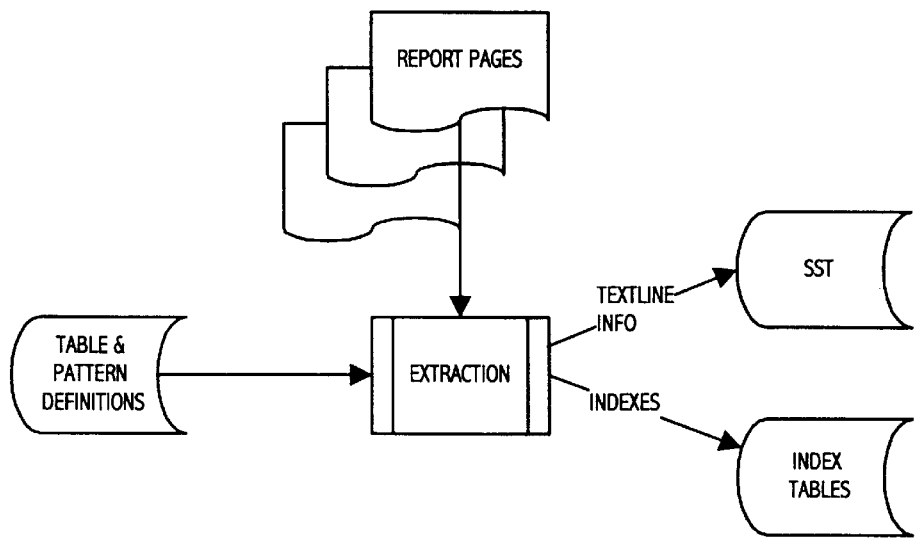
Figure 3C:
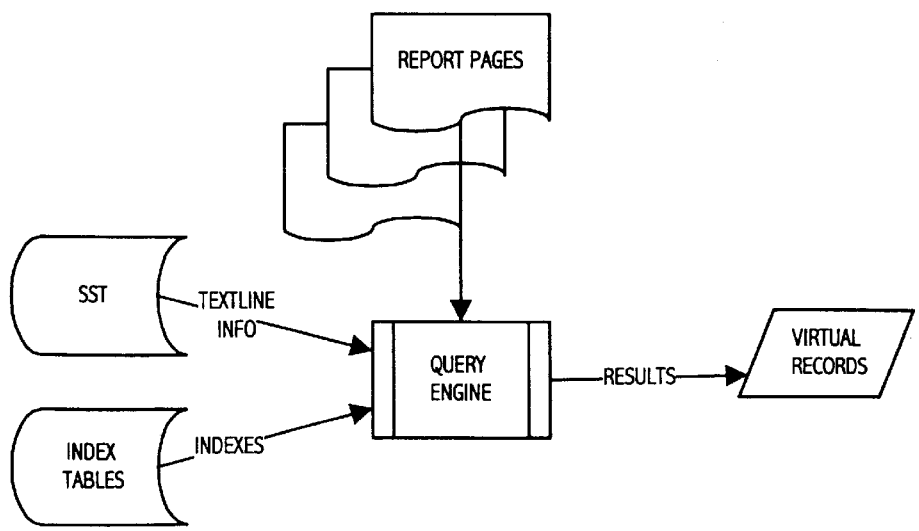
Figure 4:
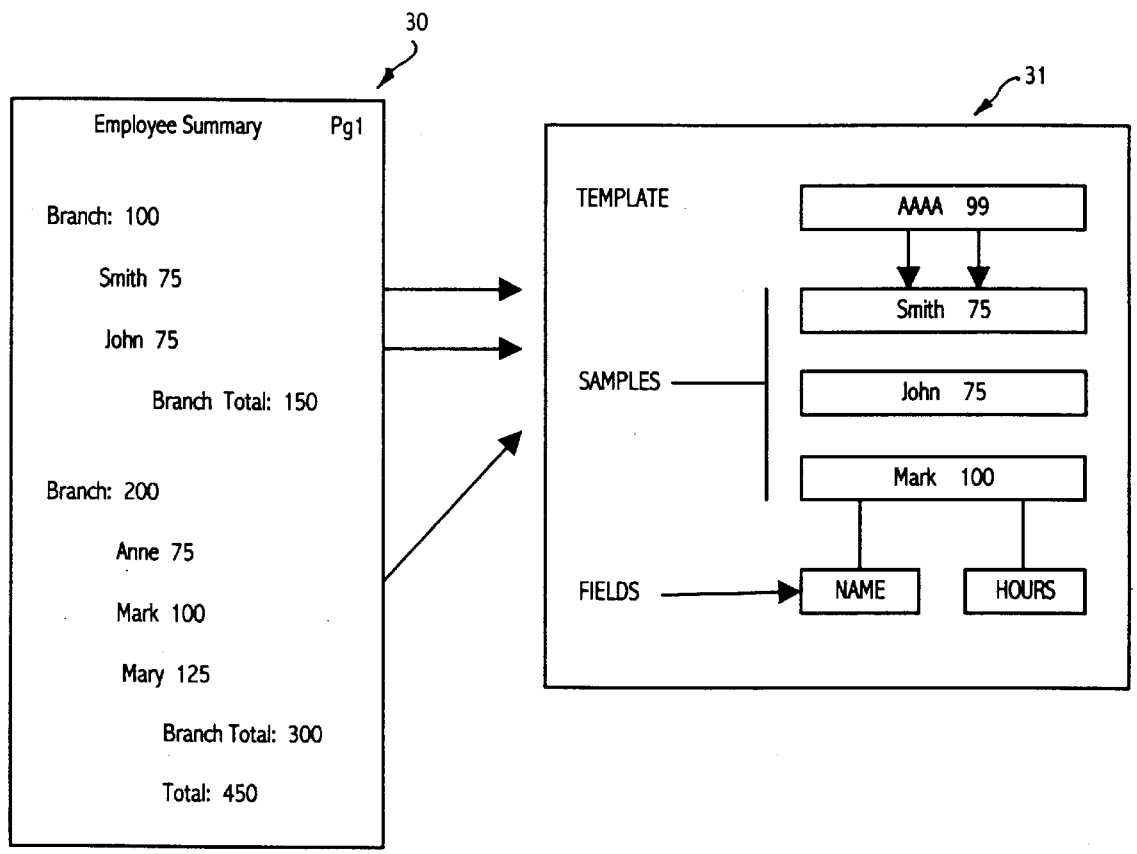
FIG. 4 is a diagrammatic illustration of a pattern abstracted from the report page of FIG. 2.

Referring to FIGS. 3A–3C, the present invention retrieves information from the data in a report-based data stream in three broad procedural phases. First, as indicated in FIG. 3A, the system abstracts patterns or Line Species and table definitions from the pages of the report, utilizing a process referred to as "Pattern Maker", employing certain system tools in response to certain user actions, to generate a series of pattern and table definitions for the report. Referring to FIG. 3B, those pattern and table definitions are then applied again to the report pages in a data extraction process, which compares the report pages with the pattern definitions and organizes the text line information for the entire report into a Structure Sequence Table ("SST"), which applies the organizational hierarchy in the table definition, and generates links among contextually related patterns, as discussed in greater detail below in connection with FIG. 6.

Finally, referring to FIG. 3C, the Structure Sequence Table is utilized in a query engine routine which queries the virtual database utilizing standard SQL "SELECT" statements to generate virtual records containing the results of the query.

The data abstraction process of FIG. 3 will now be described in greater detail in connection with FIGS. 4, 7A–7C and 8–12. Each pattern or Line Species is fundamentally represented as:

(1) a collection of text lines that are samples of it, which samples are initially automatically selected by the system and may also be added by the user;

(2) a template that provides a statistical distribution of character classes in the pattern; and (3) a collection of fields which, together, form a meta-definition based on the samples.

A field definition is defaulted by the system and can be changed by the user. Each field maps to a column of data in the samples making up the pattern, each field being defined by a data type, e.g., alphabetical (alpha), numeric or alpha-numeric. Thus, referring to FIG. 4, the Employee Detail Line Species 31 is the meta-definition for the employee detail text lines of the report 30 of FIG. 2. Each of these text lines includes two fields, a name field and an hours field. For reasons which will be explained more fully below, only three of these text lines form sample members of the species. The species pattern has a template consisting, on average, of four alpha characters and two numeric characters. Note that, while in the first sample member the name field has five alpha characters, when the statistical distribution for all of the samples is considered, a field of four alpha characters predominates, so that number of characters is used in the template. Similarly, the template has two numeric characters, since the hours field for two of the three sample members has only two numeric characters. Table I, below, defines all of the patterns or Line Species in the report of FIG. 2, giving for each pattern its name and the names of its constituent fields.

TABLE I

| Pattern | Field |
| --- | --- |
| Report Header | Report Name |
|  | Page Label |
|  | Page Number |
| Branch Detail | Branch Label |
|  | Branch Code |
| Employee Detail | Name |
|  | Hours |
| Branch Total | Branch Total Label |
|  | Branch Total Hours |
| Report Total | Total Label |
|  | Total Hours |

Figure 7A:
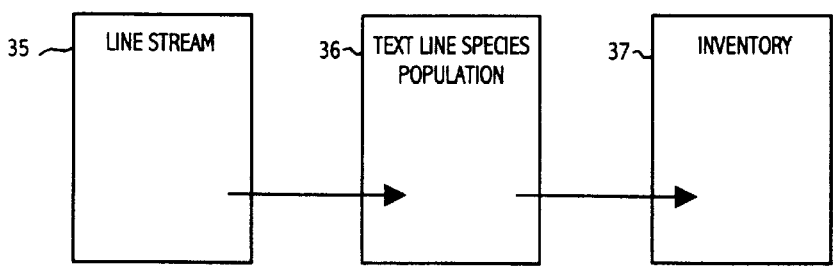
FIGS. 7A–7C are diagrams illustrating the process of pattern abstraction from a report like that of FIG. 2.
Figure 7B:
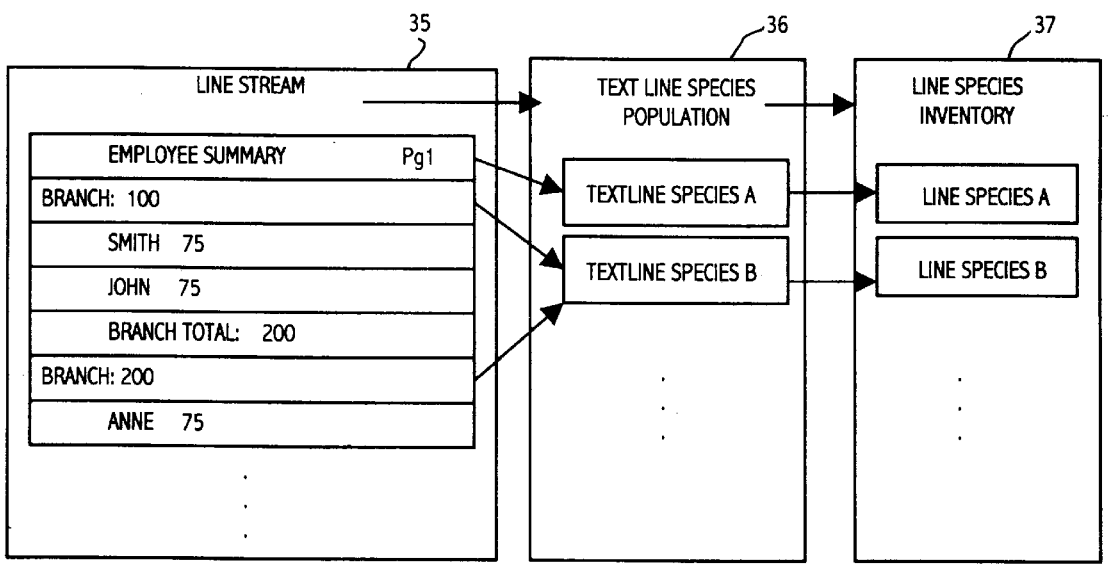
Figure 7C:
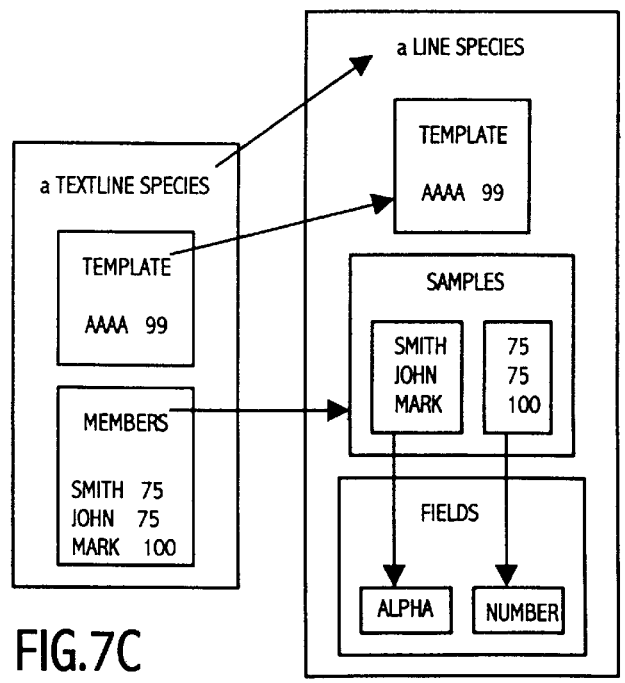

The overall abstraction process is outlined in FIGS. 7A–7C with respect to the report of FIG. 2. The data stream 35 of the report is first processed at 36 to identify the text line species therein, clustering the text line samples into non-overlapped sets which will be referred to as "text line species", the collection of which is referred to as a "population". Thus, referring to FIG. 7B, the Report Header pattern comprises a text line species A, the Branch Detail headers comprise text line species B, and so on. Referring to FIG. 7C, each of the text line species is represented by a template and the members which make it up. Each text line species is then, at 37, further processed to generate an object definition for it in terms of its constituent fields, converting it to a defined Line Species. The collection of Line Species is referred to as an "Inventory". In deriving a Line Species from a text line species, the members of the text line species are designated as samples of the Line Species and the constituent fields which describe these samples are defined by character type, as in FIG. 7C.

Figure 8:
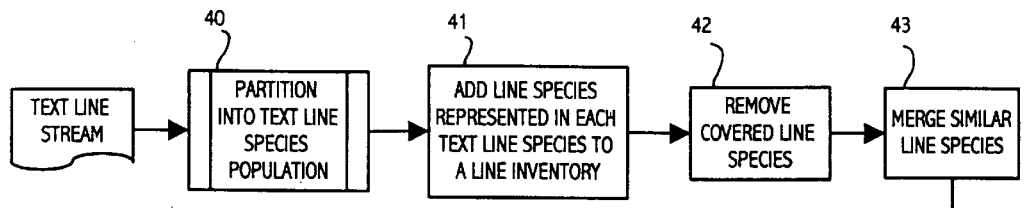
FIG. 8 is a flow chart diagram of the automatic generation of a line species inventory in accordance with the present invention.
Figure 9:
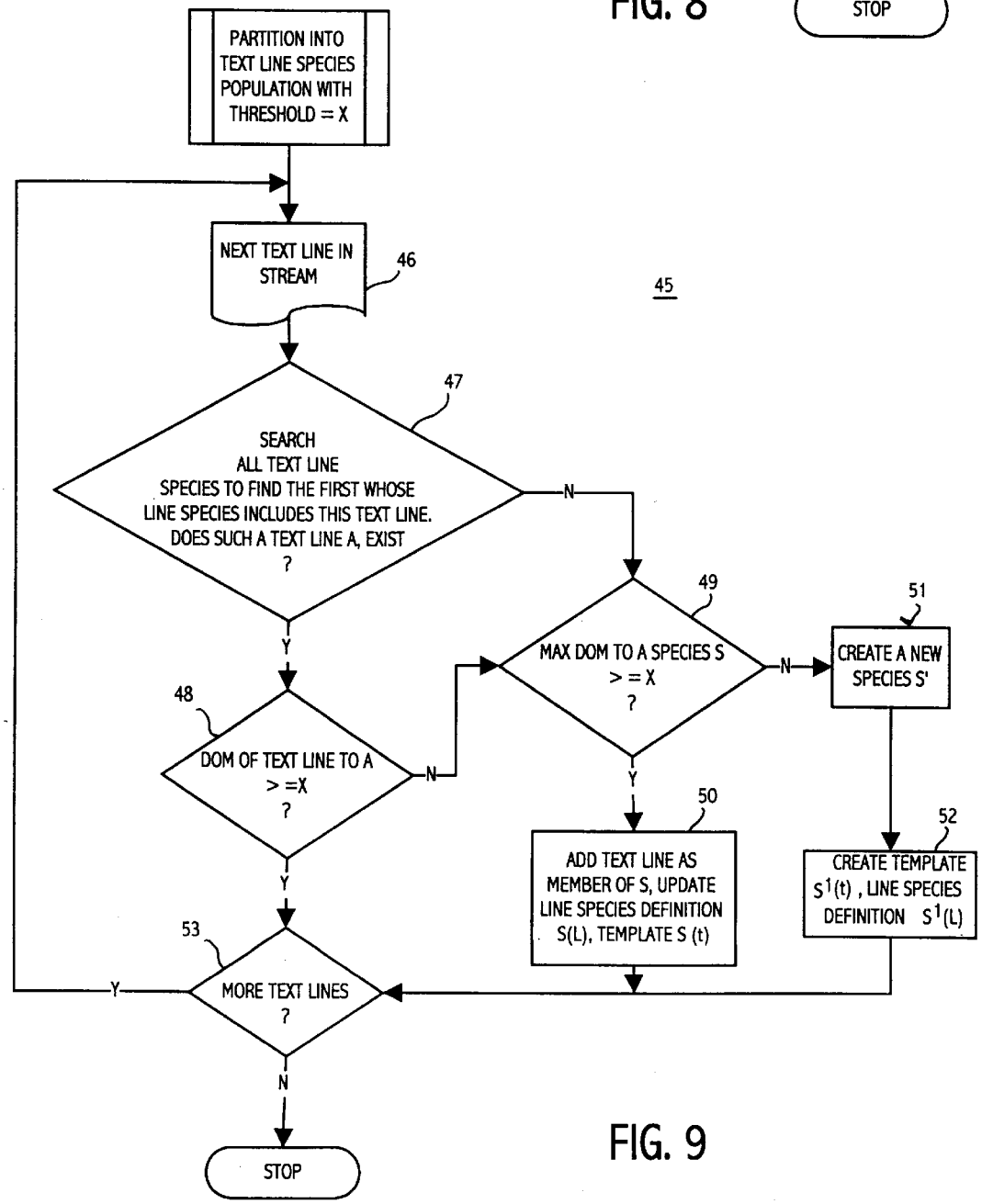
FIG. 9 is a flow chart diagram of the software routine for creating a population of text line species in accordance with the present invention.

Referring now to FIGS. 8 and 9, this abstraction process will be explained in further detail. The fundamental function of the abstraction process is the automatic generation of a Line Species Inventory from a group of contentful (non-blank and non-punctuation) text lines, given a "degree of membership" ("DOM") threshold, which is a numeric value derived using empirical analysis. Referring to FIG. 8, the method of automatically generating the Line Species Inventory is broadly described. At 40, the text lines from a stream of data are clustered into text line species, in accordance with the DOM threshold, which is a criterion for determining the degree of similarity between a text line and a species template required for the text line to be included in the species. The collection of text line species forms the text line species population. At 41, each text line species in the population is associated with a Line Species object or definition that grammatically describes its members in terms of its constituent fields. Each field is described by a primary (mandatory) and secondary (optional) data type. Secondary data types are not abstracted. The collection of Line Species associated with the population of text line species forms the Line Species Inventory abstracted for the given text lines. The foregoing steps take place concurrently, i.e., as each text line species is formed or updated its Line Species definition is also generated or updated. Then, for each Line Species in the Inventory, numeric fields' dimensions are optimized by expanding the field widths to the left, where possible, in order to preempt future samples that might require field width re-sizes.

Next, at 42, "covered" lines in the Line Species Inventory are removed. Thus, for each Line Species L1, if there is another Line Species L2 that covers L1, then L1 is removed from the Inventory. A Line Species L1 is said to cover L2 if all possible instances of L2 also belong to L1, as will be explained more fully below. At 43, all "similar" Line Species in the Inventory are merged. When similar Line Species are found, a new Line Species object is created using the combined samples of the similar Line Species as the new samples for the merged Line Species. The two similar Line Species are removed from the Inventory, and the new merged Line Species is added to the Inventory. The determination of whether or not Line Species are "similar" for purposes of merger will be explained in greater detail below.

The first step in the abstraction process of automatically generating a Line Species Inventory, i.e., the creation of a population of text line species, will be explained in greater detail in connection with FIG. 9. The creation of a population of text line species entails the use of the concepts of a pattern "template", "line inclusion" and "degree of membership" (DOM). As was indicated above, a text line species describes its members using a template, which is a concatenation of the most predominant character class for each character column in a collection of text lines. Referring to Table II, in constructing the template for a collection of text lines, an initial template is obtained using the first text line in the collection.

TABLE II

| New Member | Template after member was added | What happened |
|---|---|---|
| "Smith 75" | "AAAAA 99" | The template represents the single member exactly |
| "John 75" | "AAAAA 99" | Everything is the same (position 5 is statistically still an alpha) |
| "Mark 100" | "AAAA 99" | Character at position 5 in the template changes to space (because position 5 in the members is now predominately space). (Position 7 is statistically still a space.) |

Thus, given the following collection of text line strings:
 "Smith 75
 "John 75
 "Mark 100", The first member "Smith 75" has a template "AAAAA 99", wherein "A" represents an alpha character and "9" represents a numeric character. The template matches the text line exactly, since it is the only member of the species to this point. As each new text line is added as a member of the species, the template is adjusted by comparing all current members of the species with the template for conformance with the predominant character class representation at each character position. If the number of exceptions at each position is greater than the number of members in the species divided by two (i.e., more than one-half the members fail to conform to the template at that character position), then all of the members are used to find the character class with the maximum frequency at that character position and the template is replaced at that position with the new character class representation. Thus, when "John 75" is added to the species the template remains unchanged. The fifth character position is still statistically an alpha character since, while there is now an exception at that position ("John 75" has a space at that position), not more than one-half the members fail to conform to the template at that position. Then, when "Mark 100" is added to the species, the character at position 5 in the template changes to a space, because the position is now predominantly a space (two of the three members now have a space at that position). While, at position 7, the new member has a numeric character, that position remains statistically a space.

Another concept involved in the creation of a population of text line species is line inclusion. A text line species definition "includes" a line of text if:

1. the space regions between field boundaries of the species correspond to white space in the text line; and
2. every field in the definition satisfies the corresponding sub-string in the text line.

A field satisfies a string if the field's data type (primary or secondary) matches the string, OR the field can be "optional" and the string is all blanks. A data type matches a string if the syntactic definition and matching rules of the type are satisfied. Thus, for example, referring to FIG. 7C, the boundaries of the alpha and number fields are set forth by the boxes around those fields. There is a single space between these field boundaries. Accordingly, this Line Species definition would "include" the text line "Mary 125", of the report of FIG. 2, since the space region between the field boundaries corresponds to a white space in the new text line and every field in the definition satisfies a corresponding sub-string in the new text line, in that their data types (alpha for the first field and number for the second field) match.

The "degree of membership" of a text line to a text line species is defined as the average of the similarity of the k-th character in a text line to the k-th character in the template of the text line species. Thus, DOM=(sum of character similarities)/number of non-space characters in the string obtained by superimposing the template and the text line). In any text line the characters may be of four types: space, punctuation, digit (or numeric) and alpha (or alphabetical).

The similarity index between two character classes C1 and C2 is given in Table III.

TABLE III

| C1 → C2 ↓ | space | punctuation | digit | alpha |
|---|---|---|---|---|
| space | 0.0 | 0.4 | 0.4 | 0.4 |
| punctuation | 0.4 | If C1 = C2 then 1.0, else 0.3 | 0.3 | 0.2 |

TABLE III-continued

| C1 →<br>C2 ↓ | space | punctuation | digit | alpha |
|---|---|---|---|---|
| digit | 0.4 | 0.3 | 1.0 | 0.8 |
| alpha | 0.4 | 0.2 | 0.8 | 1.0 |

Given this similarity index, which is determined empirically, by way of example the degree of membership of "Smith 75" to the template "AAAA 99" is given by Table IV.

TABLE IV

| Template | A | A | A | A | | 9 | 9 | (A = Alpha,<br>9 = Digit) |
|---|---|---|---|---|---|---|---|---|
| String | S | m | i | t | h | 7 | 5 | |
| Character similarities at each position based on the above similarity index (Table III) | 1 | 1 | 1 | 1 | .4 | 1 | 1 | Total = 6.4 |
| Non-space in either<br>1 = Yes,<br>0 = No) | 1 | 1 | 1 | 1 | 1 | 0 | 0 | 1 | 1 | Total non-space = 7 |

Thus, it can be seen that DOM=6.4/7=0.914.

With these background concepts in mind, the creation of a population of text line species can be described with reference to the software algorithm 45 illustrated in FIG. 9. Given a data stream including a collection of contentful sample text lines, and a DOM threshold X, the next text line in the collection is acquired at 46 and compared with all of the existing text line species to find a species that includes this text line, the routine checking at 47 to see if such a species A exists. If it does, the DOM of the text line to the species A is checked at 48 to see if it is greater than or equal to X.

If, at 47 and 48, either the text line is not included in an existing species or does not have the requisite DOM, the program checks at 49 for the species S to which the text line has the maximum DOM and determines if that DOM is greater than or equal to X. If it is, it is added as a member of S and the definition of the Line Species S and the template therefor are updated at 50 accordingly.

It is important to distinguish between a text line being "included" in a text line species and a text line being "added to" the species as a member. The object of the FIG. 9 procedure is to create a population of text line species that cluster text lines into non-overlapped sets. Thus, a text line is added to a species' member list only if it somehow changes the structural description of that species, so that all stored members in the member list for the species will be grammatically distinct from one another. Thus, if the new text line meets the inclusion and DOM criteria at 47 and 48, it is considered as already being "included" in the species and need not be added.

If, at 49, there is no species which meets the DOM requirement, the program at 51 creates a new species S' for the text line and, at 52, creates the template and Line Species definition therefor.

The program then checks, at 53, to see if there are any more text lines to be considered and, if so, returns to 46. If not, the population of text line species has been completed.

As was indicated above in connection with FIG. 8, during creation of the text line species population, each species in the population is associated with a Line Species object or definition that grammatically describes its members in terms of its constituent fields to create the Line Species Inventory and then, for each Line Species in the Inventory, its field dimensions are optimized.

In building a Line Species definition, its fields need to be determined from its samples. For each field, it is required to find the boundary and primary data type matching the sample. Thus, given the samples of a Line Species, the system automatically recognizes the fields by splitting the samples into vertical columns separated by white space boundaries. Each column represents a field, the boundary of which is the column's boundary. For each text string column, the system finds the data type with the highest specificity that includes all of the text strings in the column and this is set as the most appropriate primary data type. The determination of the data type with the highest specificity is in accordance with a specificity hierarchy. Thus, when a text sample field is satisfied by more than one data type, the system needs to make a decision as to which one should be selected for the field. That type is selected which is the most "specific", i.e., has the tightest, most specific definition. Base types in the system are ordered by pre-set specificities. Custom types are considered more specific than their more general parents. With the custom types of a single type, specificities are assigned by calculating a specificity gradient, where possible. Specificity gradients are based on weights assigned to data type characteristics, such as the number of characters allowed, "constant characters", i.e., those characters which must appear as is in the field value (e.g., all constant text in the pictures and all single character place holders, such as mask symbols, plus sign, minus sign, etc.), and length of the picture (e.g., date or time style).

If any of the samples are blank, the field is initialized as optional. If the fields, boundaries are to be optimized then, for each numeric field in the Line Species definition, the system attempts to expand its left boundary as much as possible. Thus, if the primary type expandable to the left, and the left-hand neighbor of the field is either non-existent or non-expandable to the right or already has sufficient width, then the field is expanded to the left up to the beginning of the line or up to its left-hand neighbor, respectively, keeping within the maximum width constraints for the field's type.

After generation of the Line Species Inventory, the system removes "covered" Line Species in the Inventory. The concept of Line Species "coverage" may be understood with reference to FIG. 10. Given any two Line Species L1 and L2, L1 will cover L2, if every possible instance of L2 will be an instance of L1. Coverage deals with the recognition of one definition by another, where all statistically possible text combinations need to be considered rather than a known, finite text line or string. Coverage algorithms provide assistance in understanding relations between Line Species. Coverage is also referred to as "normal coverage".

Character sets and character templates (not to be confused with Line Species templates) are used extensively for coverage determination. A character set is a set of all possible characters allowed. A character template is an ordered collection of character sets that represents the characters allowed at each position in a data type instance. Character templates are applicable to a sub-set of the types that have known characters appearing at known positions. Each data type has the capability of recognizing a character template as well as an ordinary text string.

Line Species coverage is determined in accordance with the following criteria:

Line Species L1 covers Line Species L2 if:
1. For every field FDi in L1
   FDi overlaps one field FDj in L2 AND FDi covers FDj normally;
   Or FDi does not overlap any field in L2 AND FDi is optional; and
2. Every field in L2 is overlapped by some field in L1.

Field FDi (with primary type P1 and secondary type S1) normally covers Field FD2 (with primary type P2 and secondary type S2) if the following three criteria is met:
1. FD1's boundary surrounds FD2

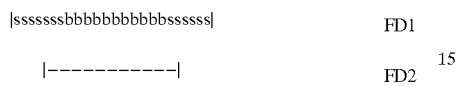

|ssssssssbbbbbbbbbbbbsssss| FD1

|----------| FD2

Here FD1 surrounds FD2. Their intersection is marked by b's in FD1.
2. If S1 exists, then
   P1 covers P2 OR S1 covers P2
   AND if S2 exists, P1 covers S2 OR S1 covers S2
   Else, if S1 does not exist, then
   P1 covers P2
   AND if S2 exists, P1 covers S2.
3. If FD2 is optional then
   FD1 is also optional.

One field's data type A covers another B if every possible instance of B is also an instance of A. Types A and B need not necessarily be the same. Cross-type coverage is checked using type characteristics and character template inclusion (whether a type satisfies another's character template). (Coverage tries to eliminate the assignment of many Line Species when there should only be one—this happens when a data type allows diverse text patterns and a partition occurs due to this diversity). Thus, data type A covers data type B if:
   B does not exist (possible for secondary types since they are optional)
   OR A=B
   OR B is a sub-type of A (e.g., A=Alphanum and B=alpha)
   OR A satisfies the concatenation (space region+B's template+space region)

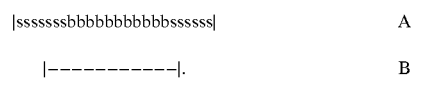

|ssssssssbbbbbbbbbbbbsssss| A

|----------|. B

Figure 10:
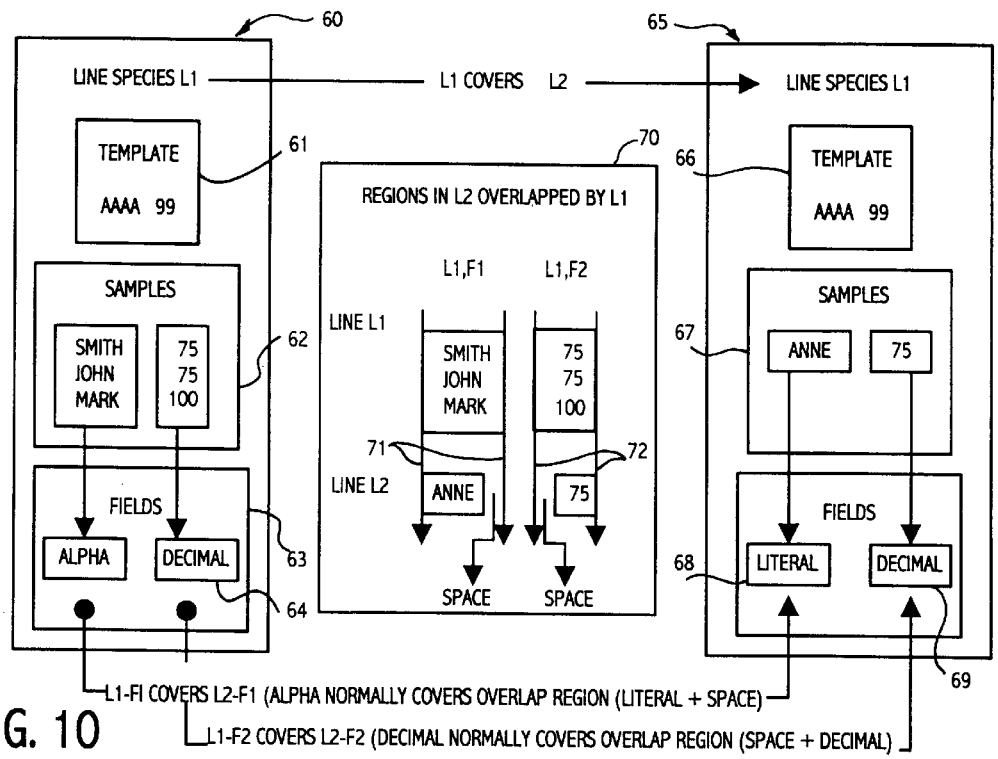
FIG. 10 is a diagram illustrating the concept of line species coverage in accordance with the present invention.

These criteria are illustrated in FIG. 10, which shows how a Line Species L1, designated 60, covers a Line Species L2, designated 65, with the regions in L2 overlapped by L1 being indicated at 70. Line Species L1 has a template 61, three samples 62 and two fields including an alpha field 63 and a decimal field 64. Line Species L2 has a template 66, a single sample 67 and two fields, including a literal field 68 and a decimal field 69. A "literal" field is a field which appears identically in each text line sample in the Line Species definition and, since Line Species L2 has only a single sample, its first field is necessarily a literal one. The regions in L2 overlapped by L1 are indicated at 70, wherein the vertical arrows 71 designate the field boundaries for L1, F1, whereas the vertical arrows 72 designate the field boundaries for L1, F2.

After all covered Line Species are removed from the Line Species Inventory, all "similar" Line Species in the Inventory are merged. The concept of Line Species "similarity" utilizes the concept of two additional types of coverage other than normal coverage, viz.,:
   (a) shifting coverage—wherein normal coverage criteria were not satisfied because some numeric field in one Line Species was not of the same length as its counterpart in the other, i.e., it "shifted" (also called "numerical coverage"); and
   (b) concatenation coverage—wherein the normal coverage criteria were not satisfied because some text fields in one Line Species are surrounded by a long text field in the other (takes into account the white space intervention in alpha fields).

Line Species L1 is similar to Line Species L2 if:
1. For every field FDi in L1,
   EITHER FDi overlaps exactly one field FDj in L2
   AND (FDi normally covers it
   OR (FDj is not overlapped by any other field AND FDi numerically covers it)
   OR (FDi covers it as a concatenation of one field)
   OR FDi does not overlap any field in L2 AND FDi is optional
   OR FDi overlaps many fields in L2 AND FDi covers their concatenation; and
2. Every field in L2 is overlapped by some field in L1. The system checks for FDj not overlapped by any other field in L1, since it is interested in this case:

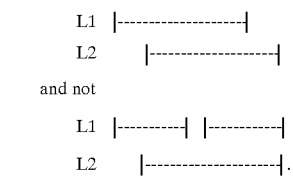

L1  |------------------|
L2        |------------------|
and not
L1  |----------| |----------|
L2        |--------------------|.

Numerical coverage tries to eliminate the assignment of many Line species when there should only be one—this happens when a data type allows diverse text patterns and a partition occurs due to this diversity. Numerical coverage identifies diversity caused by numbers that extend outside the field's bounds for the reason that they are larger than the ones used in the initial samples (e.g., 99 as opposed to 9999).

Field FDi numerically covers Field FD2 if:
1. FD1's boundary overlaps FD2 but does not surround it;
2. FD1's primary type is numeric;
3. FD1's primary type numerically covers FD2's primary type; and
4. Secondary types are not taken into consideration Data type A numerically covers data type B if: (Numerical coverage is only defined for types that are numeric)
   A=B
   OR B represents a number
   OR A allows spaces an satisfies B's template

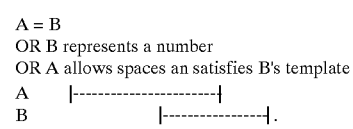

A = B
OR B represents a number
OR A allows spaces an satisfies B's template
A   |---------------------|
B                  |---------------|.

Concatenation coverage is useful for TEXT fields since an uneven distribution of white space within a column of report data may cause the system to think that there is more than one field in that report column or one shorter field in that region. Using concatenation coverage, an attempt is made to try an collapse those fields into a single field that is better representative of the report column data (e.g., L1 is similar to L2 and L3 in the marked region below using concatenation coverage).

Field FD1 covers the concatenation of many Fields FDi if:
(Concatenation coverage is only defined for some TEXT types)
1. FD1 surrounds the concatenation of all the other fields' data types;
2. The primary type of FD1 and every FDi has data type TEXT;
3. FD1 and every FDi have no secondary types; and
4. FD1's primary covers the concatenation of every FDi's primary; include spaces in the concatenation if there are intervening spaces or if one of the fields FDi is optional.

Data type A covers (concatenation) data type B if:
(Concatenation coverage is only defined for types that are text)

A = B
OR A includes B's character set

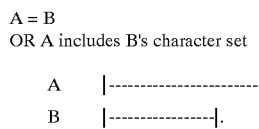

Figure 11:
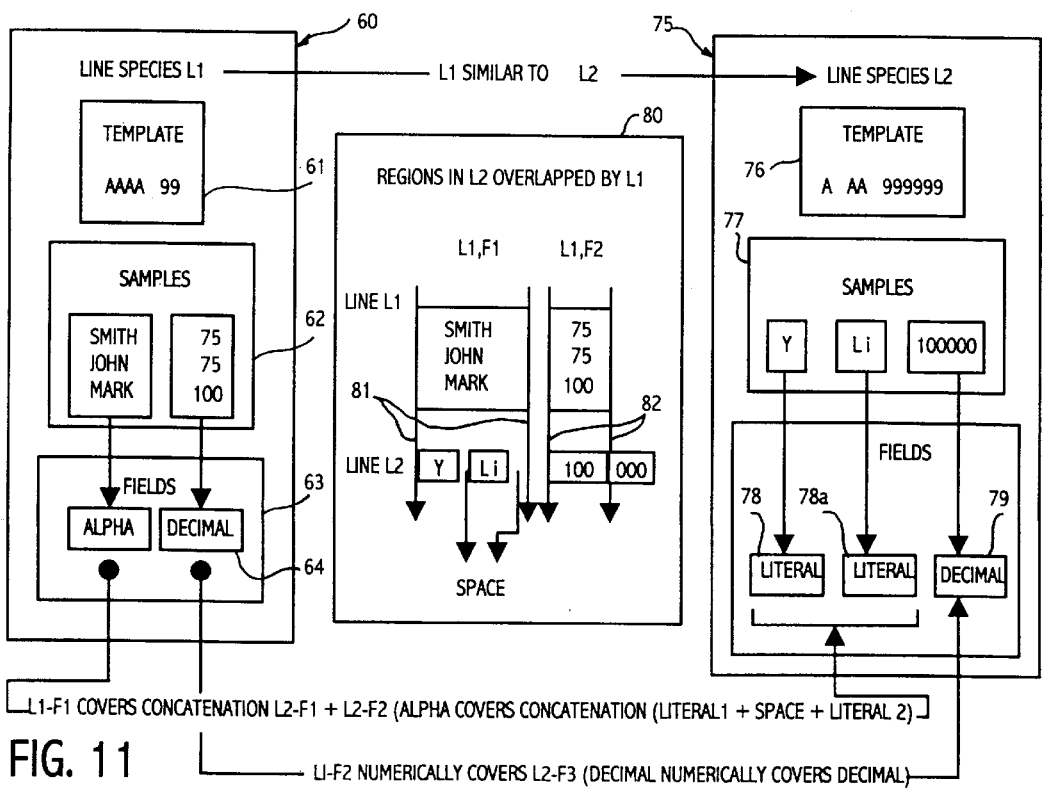
FIG. 11 is a diagram illustrating the concept of line species similarity in accordance with the present invention.
Figure 12:
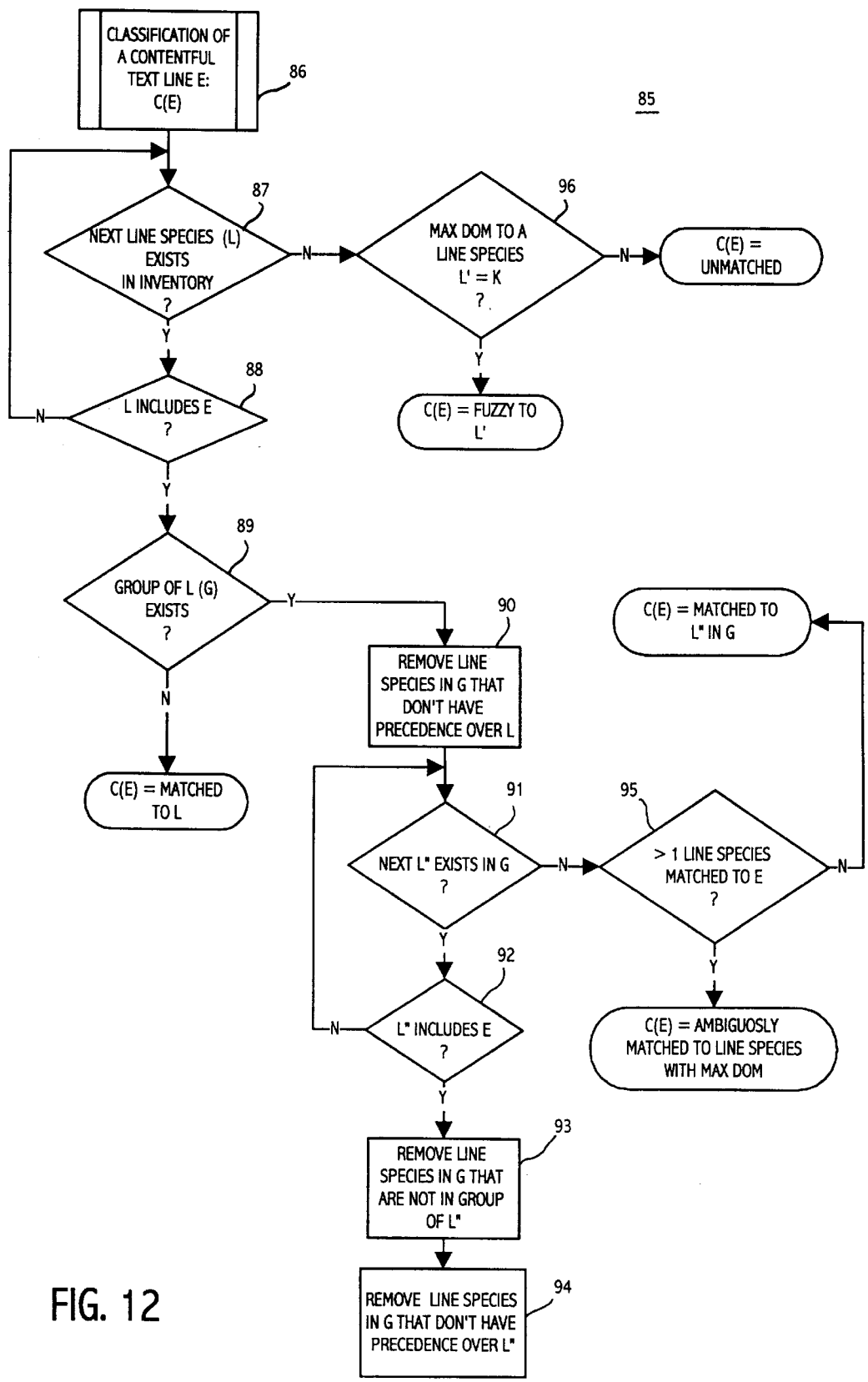
FIG. 12 is a flow chart diagram illustrating a software routine for classification of a text line to a single pattern in accordance with the present invention.

These criteria are illustrated in the diagram of FIG. 11, which shows a Line Species L2 at 75 which is similar to the Line Species L1 at 60, which is the same Line Species L1 described above in FIG. 10. The regions in L2 overlapped by L1 are designated at 80. The Line Species L2 (75) has a template 76, a single sample 77 made up of two literal fields 78 and 78a and a decimal field 79. The regions in L2 overlapped by L1 are indicated at 80, wherein the vertical arrows 81 designate the field boundaries for L1, F1, while the vertical arrows 82 designate the field boundaries for L1, F2. As can be seen from this diagram, L1, F1 (63) covers the concatenation L2, F1 (78)+L2, F2 (78a). Also, L1, F2 (64) numerically covers L2, F3 (79) in accordance with the shifting coverage definition.

After all similar Line Species L in the Inventory have been merged the automatic generation of a Line Species Inventory is complete.

The Line Species Inventory, once generated, is utilized in the data extraction process by generating certain tables, as will be explained more fully below. To facilitate the extraction process, another feature of the abstraction process of the invention is the grouping of Line Species in an Inventory. A good Line Species Inventory should consist of Line Species that are distinct enough from one another so that any text line instance will match to one and only one Line Species in the Inventory, without ambiguities. The idea of Line Species grouping is that all Line Species that are similar enough to one another are put in the same group. The algorithm used will guarantee that no text line can match two Line Species that belong to two different groups. The groupings provide a measure of the quality of a Line Species Inventory and also serve as a guide for further refinement of a Line Species Inventory.

Even after careful refinement of Line Species Inventories, ambiguities in syntax match could still exist. In some situations, it is clear which Line Species to pick in the case of an ambiguity. If so, "precedence" can be defined between the two Line Species such that the Line Species with the higher precedence will be picked. Precedence can only be defined between Line Species that are in the same group. Within a group, precedence relations obey transitive closure (i.e., if A-B, and B-C, then A-C, where "-" represents a relation).

In grouping Line Species in an Inventory, given a Line Species LINE_A in an Inventory, the allowed character set for each column position in LINE_A is compared with all the other Line Species in the Inventory. If the allowed character sets of a Line Species LINE_B overlaps with that of LINE_A for all column positions, then LINE_B is a group member of LINE_A.

The Line Species Inventory, once generated may be improved over a stream of data. The Inventory is automatically adjusted or enhanced to include every line of text in the data stream. The improvement process classifies all text lines in the stream, the possible classification results being:
(a) normal match—the text line has been perfectly included by one and only one Line Species in the Inventory;
(b) ambiguous match—the text line was perfectly included by more than one Line Species, the most similar of which (using DOM) is picked by the system;
(c) fuzzy match—the text line was not perfectly included by any Line Species in the Inventory, but was found to be similar (DOM was greater than a predefined threshold) to a particular Line Species; and
(d) unmatched—the text line was neither included by, nor was it similar to any Line Species in the Inventory.
(For details of the line classification process, see the discussion of LST generation, below).

The improvement to the Inventory that is required (if at all) is based on the classification result for each text line. If there is a normal or ambiguous match, nothing need be done. If there is a fuzzy match or no match, then the text line is an exception and the Line Species Inventory must be improved to be able to include it. For a fuzzy match, the improvement involves changing the Line Species that fuzzily matches the text line, so that the Line Species will exactly match it. If it is not matched by anything, than it is added to a text line population which dynamically partitions itself into species of text lines, a new Line Species being created for each such text line species.

The classification process is also used in the generation of the LST. The algorithm for LST generation will be described in connection with the software routine 85 illustrated in FIG. 12. The system scales forward, line-by-line, through the report and checks for contentful lines and, for each contentful line E found, enters the classification routine at 86. The routine first checks to see if the text line is included in any Line Species in the Inventory. Thus, the routine first checks at 87 to see if there is another Line Species L in the Inventory and, if so, checks at 88 to see if L includes the text line E. If not, the routine returns to 87 and continues checking until all the Line Species in the Inventory have been considered.

If L includes E, the routine checks at 89 to see if L is part of a group G. If not, then the text line E is classified as being matched to the Line Species L. If L is part of a Group, then at 90, the system removes all lines in the Group G that do not have precedence over L. The routine then checks all of the other Line Species L" in the Group, since the system will not permit a text line to be matched to more than one Line Species in a group. Thus, the routine checks at 91 to see if there is another Line Species L" in the Group G and, if so, checks at 92 to see if it includes the text line E. If it does, the routine next, at 93, determines whether the Line Species L" has its own group and, if so, the routine removes all lines in the Group G that are not in the group of L". In other words, the system is only interested in Line Species in the intersection of the groups of L and L". Then at 94 the routine also removes any lines in G that do not have precedence over L", and then returns to 91 to check for the next Line Species in G. Once all of the Line Species in G have been checked, the routine moves to 95 to determine if there is more than one Line Species in G matched to the text line E. If not, then E is matched to L". If there is more than one match, then the text line is deemed ambiguously matched to the Line Species in that set to which it has the highest DOM.

If, at 87, there are no more Line Species L in the Inventory, the routine moves to 96 to determine if there is any Line Species L' to which the text line E has a DOM greater than or equal to k. If so, the text line E is classified as fuzzily matched to that Line Species to which it has the highest DOM and, if not, it is classified as unmatched.

Figure 13:
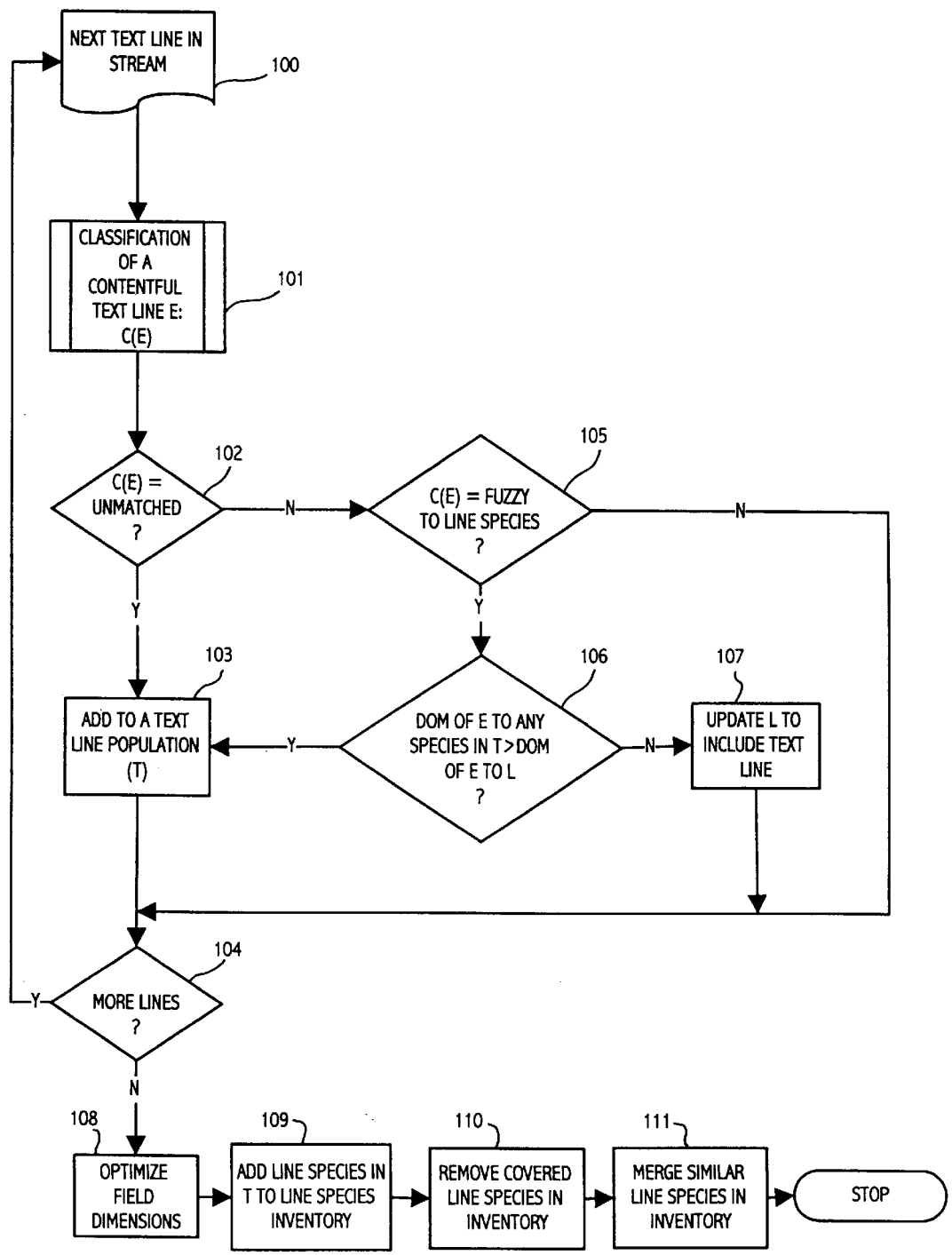
FIG. 13 is a flow chart diagram illustrating software routine for improving a line species inventory in accordance with the invention.

The manner in which a Line Species Inventory is applied over a new text line stream and improved, if necessary, may be explained with the aid of the software routine illustrated in FIG. 13. First, the system initializes an empty text line population which will receive all unmatched text lines and create new Line Species definitions for them. Then the next text line in the stream is acquired at 100 and, if it is a contentful text line E, it is classified at 101 in accordance with the classification scheme described above and assigned a classification C (E). Next, at 102, the program checks to see if the classification is unmatched and, if it is, the text line is added at 103 to a text line population T. The program then checks at 104 to see if there are any more text lines and, if so, returns to 100. If, at 102, the classification of the text line was not unmatched, the program checks at 105 to see if it was a fuzzy match to a Line Species L. If so, the program checks at 106 to see if the DOM of the text line E to any existing species in the population T is greater than the DOM of E to Line Species L. If so, it is added to the text line population T at 103 and, if not, it is added to the sample of Line Species L and the program updates the Line Species definition at 107 to include the new text line and returns to 104. If added to the text line population T, the new text line either belongs to an existing species in the population T or a new one is created for it. If, at 105, the classification of text line E was not a fuzzy match, the program returns directly to 104.

If, at 104, there are no more lines, the new text line population T is complete, and the program then, at 108, optimizes the field dimensions for the Line Species definition associated with each species in the population T, and then, at 109, adds the Line Species in the population T to the Line Species Inventory. Then the program removes covered Line Species in the Inventory at 110, and merges similar Line Species therein at 111.

The system utilizes a temporary LST for automatic generation of a virtual table of the functional relationships among the Line Species in the Inventory. Thus, the system scans through the LST to collect statistics on location and occurrence frequency of the different Line Species, the occurrence frequency excluding any line instance that maps to an all-literal Line Species (one where all fields have the data type "literal" or constant text strings). Line Species roles are guessed based on the statistics. "Details" are the Line Species with high occurrence frequency and high variation as to location. Before the first Detail lines are Headers and after the last detail lines are Trailers. The system identifies page Headers, which are headers that appear on the top of every page with very little variation in their position in the page (e.g., page headers with page number, column headers, etc.).

Apart from the Headers guessed in the foregoing steps, there could be more Headers. Such remaining Headers are guessed. Thus, starting from the page header, any Line Species following it on a page (until a Detail is encountered) are identified as Headers. Apart from the Trailers guessed above, there could be more Trailers. Such remaining Trailers are guessed by starting from the page header and going backward to the previous page. Any species preceding the page header (until a detail is encountered) are identified as Trailers. The system then adjusts the table by removing the semantic roles for all-literal lines, then scans through the LST forward to collect distinct Line Species that have semantic roles and sorts the Line Species in the order of Header, Detail and Trailer. The resulting virtual table may have columns like those set forth in Table I, and defines a nested hierarchal relationship like that of FIG. 5, described above in connection with the report of FIG. 2.

All of the foregoing discussion of FIGS. 4 and 7A–13 relates to the abstraction process of FIG. 3A. After that process is completed, the system can automatically perform the extraction process of FIG. 3B. Thus, once a Line Species Inventory has been generated and refined, it can be applied to a data stream to extract report structures from a report instance. Each text line in the report instance maps to a Line Species in the Inventory. The collection of these mappings constitutes the Line Sequence Table ("LST") which, at the extraction stage, is again generated on a permanent basis. An LST entry consists of page number, line number and line ID (identifies a Line Species). For example, an LST might be:

TABLE V

| Page number | Line number | Line ID |
|---|---|---|
| 1 | 1 | 3 |
| 1 | 2 | 5 |
| 2 | 1 | −3 (redundant) |
| 2 | 2 | 3 |

Figure 6:
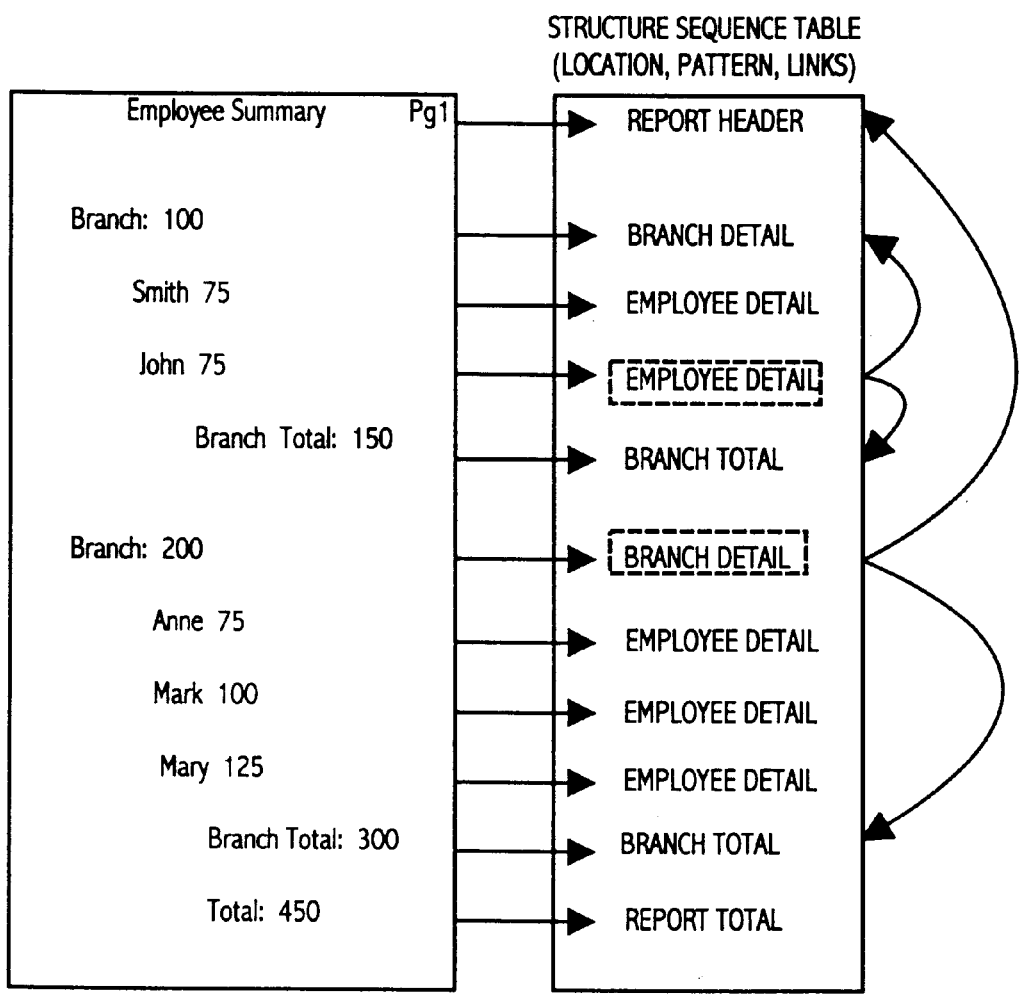
FIG. 6 is a diagram illustrating the generation of a structure sequence table for the report page of FIG. 2.

The Line ID's for the report of FIG. 2 are shown in the right-hand box of FIG. 6. Some text lines repeat themselves with the same contents across several pages in a report. They appear simply for the reader's convenience and do not contribute to and should not be a part of the report structure. Such text lines are termed "redundant" text lines. In the LST, such redundant text lines are represented by a negative line ID. Only header lines (text lines mapping to Line Species that play header roles in the table definition) need and should be checked for redundancy. The text lines that map to Line Species in the table definition and are non-redundant are termed "significant" text lines.

In determining redundancy another concept which must be considered is "forcing significance". If a Header line changes compared with its instance in a previous page, then all of the other Header lines below it at the same page will become significant. For example:

Page1:

Branch 100
Account: 1111

-continued

```
      . .
   Page2:

Branch 200
   Account: 1111
      . . .
```

The account line in page 2 is not redundant because it is an account in a different branch.

The LST does not contain any relationship between Line Species. To assist query on related information, the system creates links between LST entries that are related, a process which may be referred to as LST decoration. For this purpose, the system utilizes the relationship among Line Species contained in the virtual table, described above. The result is a Structure Sequence Table ("SST"), an example of which for the report of FIG. 2 is illustrated in FIG. 6. During the query process, virtual records are obtained by traversing up and down the links established in the SST.

Line Species in a table definition relate to each other to form a nested hierarchy as shown in the example below,

```
H1
   H2
      H3
         D1
         D2
      T1
   T2
``` where H stands for Headers, D for Details and T for Trailers. The indentation represents the level of nesting which can map to sort levels. Sort level is the distance from the detail line. In the above example, D1, D2 have sort level 0. H2, H3, T1 have sort level 1. H1 and T2 have sort level 2. The Line Species between the same sort levels have one-to-one relations, while the Line Species between different sort levels have one-to-many relations. Line Species have up/down relations with each other, such as down: H1→H2→H3→D1→D2→T1→T2
up: T2→T1→D2→D1→H3→H2→H1

The relations between any pair of Line Species are then established by transitive closure. To describe the relations we say a Line Species LINE__A is above/below a Line Species LINE__B if LINE__A has down/up relation to LINE__B.

Another concept important for the decoration algorithm is the sort level blocking. To illustrate this, look at the following sequence of line instance:

```
h1 h2 h3 d1 d2 d1 d2 h2 h3 d1 d2 d1 d2 t1 t2
       *  |_____|
              h2 blocks till t1
``` where lower case represents the instance of the corresponding Line Species. Notice that there is no instance of T1 appearing in the first instance of {H2 . . . T1} substructure. The second d2 should link down to t2 instead of t1 because the t1 belongs to a different {H2 . . . T1} structure block. To achieve this we observe that each structure protects a range of sort levels, specifically, all the ones below it or at its level. That means that a structure prohibits access to any sort levels less than or equal to itself; when a structure is encountered during a forward search, it blocks all sort levels less than or equal to itself.

In summary, during the LST decoration the system scans through the LST, and for each entry repeats the following steps:

1. Scan backwards till an instance of a Line Species that is above the current entry is encountered; link up (back) to this Line Species instance.

2. Scan forwards till (a) an instance of a Line Species that is below the current entry is encountered and (b) that the Line Species instance is not blocked by sort level; link down (forward) to this Line Species instance.

After the extraction process of FIG. 3B is completed, the system can be utilized to obtain information from the report in response to user-generated queries, as illustrated in FIG. 3C. A query is performed by first determining what access sets to create and how to iterate them. Then, for each access set created the system constructs and fetches a first virtual record from the report and, if none was found, it stops. For the virtual record constructed, the system applies the query criteria and, if valid, displays the record. It then goes on to construct the next virtual record and continues in the same manner until all virtual records responsive to the query have been constructed and displayed.

By way of example, querying the indexed report by running the query: "SELECT Page Number, Branch Code, Name, Hours, Branch Total Hours, Total Hours from Employee Summary" will give the results set forth in Table VI.

TABLE VI

| Page Number | Branch Code | Name | Hours | Branch Total Hours | Total Hours |
|---|---|---|---|---|---|
| 1 | 100 | Smith | 75 | 150 | 350 |
| 1 | 100 | John | 75 | 150 | 350 |
| 1 | 200 | Anne | 75 | 200 | 350 |
| 1 | 200 | Mark | 100 | 200 | 350 |
| 1 | 200 | Mary | 125 | 200 | 350 |

From the foregoing it can be seen that there has been provided an improved an information retrieval system which permits automatic creation of a virtual database which sets forth the patterns and pattern hierarchies inherent in a report-based data stream, so that the virtual database can then be queried using standard SQL to queries to generate virtual records responsive to the queries. In creating the virtual database, the system automatically abstracts the patterns and pattern hierarchy in the report and then extracts information from those patterns in the form of tables which set forth the functional relationships among the patterns. The abstraction and extraction processes are performed in a manner which minimizes user intervention and which is flexible and abstracts non-overlapping and unambiguous patterns.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a system of the type including a computer with associated storage media and a user interface coupled thereto for retrieving information from a report-based stream of data which includes data from a report, the improvement comprising:

a routine executed by the computer, including:
(a) a first portion automatically identifying and defining patterns in data from a report and a hierarchy among such patterns; and
(b) a second portion using the patterns and the hierarchy to automatically extract information from the data to permit creation of virtual records in response to queries.

2. The system of claim 1, wherein the data from a report is arranged in text lines comprised of fields, wherein each field is described by the type of data in it, the patterns identified by the first portion of the routine species of text lines in a report.

3. The system of claim 2, wherein the first portion of the computer routine includes a first sub-portion automatically classifying the text lines into text line species, wherein each species is representative of text lines having a predetermined relationship to one another, and a second sub-portion automatically creating a definition of each species in terms of the constituent fields of the species to form defined species.

4. The system of claim 3, wherein each field is a region of a text line including contiguous characters, and the second sub-portion of the computer routine includes a further sub-portion optimizing the boundaries of each field in a defined species by attempting to expand the left and right boundaries of the field as much as possible without encroaching on adjacent fields.

5. The system of claim 3, wherein the second sub-portion of the routine includes a further sub-portion deleting covered defined species, wherein one defined species is covered by another if all possible text lines which satisfy the definition of the one defined species also satisfy the definition of the other.

6. The system of claim 3, wherein the second sub-portion of the computer routine includes a sub-portion merging all similar defined species and creating a new definition for the merged defined species.

7. The system of claim 2, wherein the second portion of the routine includes a sub-portion automatically scanning a report line-by-line and determining for each line the defined species which the line best matches, and a sub-portion creating a list showing for each text line of the report the defined species which the text line best matches.

8. The system of claim 7, wherein the second portion of the routine further includes a sub-portion automatically generating a virtual table classifying each defined species by functional type based upon the location and frequency of occurrence of that species in the list.

9. The system of claim 8, wherein the second portion of the routine further includes a sub-portion establishing links among defined species in the list based upon functional relationships derived from the virtual table.

10. In a system of the type including a computer with associated storage media and a user interface coupled thereto for retrieving information in a report-based stream of data which includes data from a report arranged in text lines comprised of fields, wherein each field is described by the type of data in the field, the improvement comprising:

a routine executed by the computer, including:
(a) a first portion automatically classifying the text lines into text line species, wherein each species is representative of text lines having a predetermined relationship to one another; and
(b) a second portion automatically creating a definition of each species in terms of the constituent fields of the species to form an inventory of defined species.

11. The system of claim 10, wherein the first portion of the routine includes a first sub-portion creating an initial text line species made up of a first text line, and a second sub-portion comparing each subsequent text line to existing text line species and determining the relationships of the text line to the species.

12. The system of claim 11, wherein the second sub-portion of the routine determines that a text line has one of three possible relationships to existing species:
(a) the text line is already included in a species in that the text line would not alter the species definition;
(b) the text line is related to a species and is added as a member of the species to alter the species definition; or
(c) the text line is unrelated to an existing species and is used to create a new species.

13. The system of claim 12, wherein a text line is already included in a species if the text line has a degree of membership to the species within a predetermined threshold and corresponds to the species as to field data type and inter-field space regions, wherein the degree of membership of a text line to a species is determined by the average similarity of character types at each character position.

14. The system of claim 11, wherein the first portion of the routine includes a sub-portion constructing for each species a template which is a listing of the most predominant character class for each character position in the collection of lines making up the species.

15. The system of claim 14, wherein said third sub-portion of the routine includes a portion constructing an initial template using a first text line in a collection of text lines, and a portion adjusting the template after each text line is added as a member of the species by comparing all current members of the species to the template for conformance with the predominant character class representation at each character position and, if more than half the current members fail to conform to the template, using all the members to find the character class with the maximum frequency at each character position and replacing the template at that position with the new character class representation.

16. The system of claim 10, wherein the routine includes a third portion automatically generating a virtual table classifying each species by functional type based upon the location and frequency of occurrence of that species in a list of species best matched by each text line in the report.

17. The system of claim 16, wherein the third portion of the routine includes a portion sorting the line species in the virtual table in the order of header species, detail species and trailer species, wherein detail species are species with high occurrence frequency and high variation on location, header species are species which occur before the first detail species and trailer species are species which occur after the last detail species.

18. The system of claim 10, wherein the defined species make up an inventory, the routine further including a portion for improving the inventory by applying the inventory to a stream of data and automatically adjusting the inventory to include every text line in the stream.

19. The system of claim 18, wherein the third portion of the routine includes a portion which classifies each text line in the data stream to determine whether the text line matches a defined species definition exactly, partially or not at all, creates a collection of unmatched text lines and automatically classifies the collection into new species; and a portion determining whether any partially matched text line more closely matches the defined species definition which the partially matched text line partially matches or the definition of a new species and, if the former, adds the text line to the partially matched defined species and rebuilds the species definition accordingly and, if the latter, includes the text line in the collection of unmatched text lines and adds the text line to an existing new species or creates an additional new species for the text line.

20. In a system of the type including a computer with associated storage media and a user interface coupled thereto for retrieving meaningful information from a report-based stream of data which includes data from a report arranged in text lines, wherein there exists a classification of the text lines into species such that each species is representative of text lines having a predetermined relationship to one another, the improvement comprising:

a routine executed by the computer, including:

(a) a first portion automatically scanning data from a report line-by-line and determining for each text line the species which the text line best matches; and (b) a second portion creating a list showing for each text line of the report the species which the text line best matches.

21. The system of claim 20, wherein the routine further includes a third portion establishing links among species in the list based upon functional relationships.

22. A computer-implemented method for retrieving meaningful information from a report-based stream of data which includes data from a report, the method comprising:

automatically identifying and defining patterns in data from a report and a hierarchy among such patterns; and utilizing the patterns and the hierarchy to automatically extract information from the data to permit creation of virtual records in response to queries.

23. A computer-implemented method for retrieving information in a report-based stream of data which includes data from a report arranged in text lines comprised of fields, wherein each field is described by the type of data in the field, the method comprising:

automatically classifying the text lines into text line species, wherein each species is representative of text lines having a predetermined relationship to one another; and automatically creating a definition of each species in terms of the species' constituent fields to form defined species.

24. A computer-implemented method for obtaining meaningful information from a report-based stream of data which includes data from a report arranged in text lines, wherein there exists a classification of the text lines into species such that each species is representative of text lines having a predetermined relationship to one another, the method comprising:

automatically scanning data from a report line-by-line and determining for each text line the species which the text line best matches; and creating a list showing for each text line of the report the species which the text line best matches.

* * * * *

UNITED STATES PATENT AND TRADEMARK OFFICE
CERTIFICATE OF CORRECTION

PATENT NO. : 6,185,560 B1
DATED : February 6, 2001
INVENTOR(S) : Kai W. Young, Vidya S. Chandy, Aiqun Wu, Eric C. Steinhart It is certified that error appears in the above-identified patent and that said Letters Patent is hereby corrected as shown below:

Column 3,
Line 40, "species" should be -- species' --.

Column 4,
Line 43, after "medium" add -- , --.

Column 19,
Line 15, after "routine" add -- being --.

Signed and Sealed this

Eleventh Day of December, 2001

Attest:

NICHOLAS P. GODICI
Attesting Officer
Acting Director of the United States Patent and Trademark Office